(12) United States Patent
Sridhar et al.

(10) Patent No.: US 11,078,313 B2
(45) Date of Patent: Aug. 3, 2021

(54) OLEFIN-ACRYLATE COPOLYMERS WITH PENDANT HYDROXYL FUNCTIONALITY AND USE THEREOF

(71) Applicant: HENKEL IP & HOLDING GMBH, Duesseldorf (DE)

(72) Inventors: Laxmisha Sridhar, Monmouth Junction, NJ (US); Smita Shah, Edison, NJ (US); John G. Woods, Farmington, CT (US); Anthony F. Jacobine, North Haverhill, NH (US)

(73) Assignee: HENKEL IP & HOLDING GMBH, Duesseldorf (DE)

( * ) Notice: Subject to any disclaimer, the term of this patent is extended or adjusted under 35 U.S.C. 154(b) by 107 days.

(21) Appl. No.: 16/021,883

(22) Filed: Jun. 28, 2018

(65) Prior Publication Data
US 2018/0305480 A1 Oct. 25, 2018

Related U.S. Application Data

(63) Continuation of application No. PCT/US2017/017368, filed on Feb. 10, 2017.
(Continued)

(51) Int. Cl.
*C08F 210/02* (2006.01)
*C08F 210/06* (2006.01)
(Continued)

(52) U.S. Cl.
CPC .............. *C08F 210/14* (2013.01); *B32B 7/12* (2013.01); *C08F 220/20* (2013.01); *C09J 123/20* (2013.01); *C08F 210/02* (2013.01); *C08F 210/06* (2013.01); *C08F 210/08* (2013.01); *C08F 210/10* (2013.01); *C08F 216/04* (2013.01); *C08F 216/08* (2013.01);
(Continued)

(58) Field of Classification Search
None
See application file for complete search history.

(56) References Cited

U.S. PATENT DOCUMENTS 3,461,108 A  8/1969  Heilman et al.
3,496,217 A  2/1970  Drinkard, Jr. et al.
(Continued)

FOREIGN PATENT DOCUMENTS

EP  1964862 A1  9/2008
JP  62-195060 A  8/1987
(Continued)

OTHER PUBLICATIONS

Dean, John A. "11.2 Drying and Humidification." Lange's Handbook of Chemistry, McGraw-Hill, Inc., 1999, p. 11.5.
(Continued)

*Primary Examiner* — Richard A Huhn
(74) *Attorney, Agent, or Firm* — Sun Hee Lehmann (57) ABSTRACT

Copolymers prepared by a reaction of (1) an unactivated olefin, (2) an activated olefin, and (3) a hydroxyl functional activated olefin and/or a hydroxyl functional unactivated olefin are described. The copolymers have a backbone of polar vinyl monomers and non-polar alkene monomers, with pendant hydroxyl functional groups. The copolymers are well suited for optically clear, pressure sensitive, polyurethane and/or barrier adhesives.

16 Claims, 2 Drawing Sheets

Related U.S. Application Data (60) Provisional application No. 62/294,031, filed on Feb. 11, 2016.

(51) Int. Cl.

| | | |
|---|---|---|
| *C08F 210/14* | (2006.01) | |
| *C08F 220/14* | (2006.01) | |
| *C08F 220/20* | (2006.01) | |
| *C08F 216/08* | (2006.01) | |
| *C09J 123/20* | (2006.01) | |
| *B32B 7/12* | (2006.01) | |
| *C08F 216/04* | (2006.01) | |
| *C08F 210/10* | (2006.01) | |
| *C08F 210/08* | (2006.01) | |
| *C08F 220/16* | (2006.01) | |
| *C08F 220/56* | (2006.01) | |
| *C08F 220/44* | (2006.01) | |
| *C08F 220/54* | (2006.01) | |

(52) U.S. Cl.
CPC .......... *C08F 220/14* (2013.01); *C08F 220/16* (2013.01); *C08F 220/44* (2013.01); *C08F 220/54* (2013.01); *C08F 220/56* (2013.01)

(56) References Cited

U.S. PATENT DOCUMENTS

| | | | |
|---|---|---|---|
| 3,496,218 A | 2/1970 | Drinkard, Jr. | |
| 3,773,809 A | 11/1973 | Walter | |
| 4,048,422 A | 9/1977 | Sackman et al. | |
| 4,774,353 A | 9/1988 | Hall et al. | |
| 4,855,363 A * | 8/1989 | Moteki ................ | C08L 23/025 |
| | | | 525/207 |
| 4,874,884 A | 10/1989 | McKinney et al. | |
| 6,127,567 A | 10/2000 | Garner et al. | |
| 6,171,996 B1 | 1/2001 | Garner et al. | |
| 6,380,421 B1 | 4/2002 | Lu et al. | |
| 6,677,422 B2 | 1/2004 | Coca et al. | |
| 7,524,912 B2 | 4/2009 | Goodall et al. | |
| 7,884,161 B2 | 2/2011 | Jung et al. | |
| 8,163,859 B2 | 4/2012 | Jeon et al. | |
| 8,476,384 B2 | 7/2013 | Bartley et al. | |
| 2005/0143537 A1* | 6/2005 | Liu ....................... | C08F 210/02 |
| | | | 526/141 |
| 2007/0009740 A1* | 1/2007 | Burgman ............ | C08L 2666/04 |
| | | | 428/411.1 |
| 2009/0018298 A1 | 1/2009 | Michl et al. | |
| 2010/0160561 A1* | 6/2010 | Coca ..................... | C08F 210/14 |
| | | | 525/123 |
| 2010/0280198 A1 | 11/2010 | Bartley et al. | |
| 2011/0184140 A1 | 7/2011 | Jeon et al. | |
| 2015/0024236 A1 | 1/2015 | Kang et al. | |

FOREIGN PATENT DOCUMENTS

| | | | |
|---|---|---|---|
| JP | 10-81866 A | | 3/1988 |
| JP | 6-100677 A | | 4/1994 |
| JP | 2005060440 A | * | 3/2005 |
| JP | 2005-517775 A | | 6/2005 |
| JP | 2009-108128 A | | 5/2009 |
| KR | 20070093367 A | | 9/2007 |
| KR | 20080089242 A | | 10/2008 |
| KR | 20090066627 A | | 6/2009 |
| KR | 101009106 B | | 1/2011 |
| WO | 03070794 A1 | | 8/2003 |
| WO | 2009006538 A2 | | 1/2009 |
| WO | 2015024236 A1 | | 2/2015 |

OTHER PUBLICATIONS

Mecking, S, et al. "Mechanistic Studies of the Palladium-Catalyzed Copolymerization of Ethylene and alpha-Olefins with Methyl Acrylate" J. Am. Chem. Soc., 1998, 120 (5), pp. 888-899.

Drent, E. et al. "Palladium catalyzed copolymerization of ethene with alkylacrylates: polar comonomer built into the linear polymer chain" Chem. Commun., 2002, pp. 744-745.

Tian, et al. "Neutral Palladium Complexes as Catalysts for Olefin-Methyl Acrylate Copolymerization: A Cautionary Tale" Macromolecules, 2001, 34, pp. 7656-7663.

Takanaka, Kenya and Matyjaszewski, Krzysztof. "Copolymerization of (Meth)acrylates with Olefins Using Activators Regenerated by Electron Transfer for Atom Transfer Radical Polymerization (ARGET ATRP)" Macromol. Symp. 2008, 261, pp. 1-9.

Chunming Wang, Stefan Friedrich, Todd R. Younkin, Robert T. Li, Robert H. Grubbs, Donald A. Bansleben and Michael W. Day "Neutral Nickel(11)-Based Catalysts for Ethylene Polymerization" Organometallics, 1998, 17, 15, pp. 3149-3151.

Chen, Y. and Sen, A. "Effect of Lewis Acids on Reactivity Ratios for (Meth)acrylate/Nonpolar Alkene Copolymerizations" Macromolecules, 2009, 42, 12, pp. 3951-3957.

Venkatesh, R. and Klumperman, B. "Olefin Copolymerization via Controlled Radical Polymerization: Copolymerization of Methyl Methacrylate and 1-Octene." Macromolecules 2004, 37, 1226-1233.

Hua Mei, Christos Douvris, Victoria Volkis, Phillip Hanefeld, Nicole Hildebrandt, and Josef Michl "Radical Copolymerization of Isobutylene and Ethyl Acrylate with LiCB11Me12 Catalyst" Macromolecules, 2011, 44, 8, pp. 2552-2558.

* cited by examiner

OLEFIN-ACRYLATE COPOLYMERS WITH PENDANT HYDROXYL FUNCTIONALITY AND USE THEREOF

FIELD OF THE INVENTION

The present invention relates to copolymers prepared by a reaction of (1) an unactivated olefin, (2) an activated olefin, and (3) a hydroxyl functional activated olefin and/or a hydroxyl functional unactivated olefin. The copolymers have a backbone of polar vinyl monomers and non-polar alkene monomers, with pendant hydroxyl functional groups. The copolymers are particularly well suited for optically clear, pressure sensitive, polyurethane and and/or barrier adhesives.

BACKGROUND OF THE INVENTION

A number of methods for copolymerizing polar vinyl monomers with non-polar alkene monomers have been studied. See, for example, S. Meckling et al, *J. Am. Chem. Soc.* 1998, 120, 888; E. Drent et al, *Chem. Comm.* 2002, 744; G. Tian et al, *Macromolecules* 2001, 34, 7656; K. Tanaka et al, *Macromol. Symp.* 2008, 261, 1; Y. Chen et al, *Macromolecules,* 2009, 42, 3951; S. L. Bartley, et al, U.S. 2010/0280198; U.S. Pat. No. 3,461,108; R. Venkatesh et al, *Macromolecules,* 2004, 37, 1226; H. Mei et al, *Macromolecules,* 2011, 44, 2552; and C. Wang et al, *Organometallics,* 1998, 17, 3149, for some discussions. Also of interest are U.S. Pat. Nos. 6,677,422; 7,884,161; and 4,048,422; EP 1964862; and publications U.S. 2010/0280198 and U.S. 2009/0018298. Use of strong Lewis acids was found to be necessary for enhancing the reactivity of polar vinyl monomers with olefins to increase the efficiency of copolymerization; however, obtaining high molecular weight copolymers with high olefin content has been generally difficult. Any success has been achieved only with lower olefin monomers such as ethylene and propylene, which too, required high pressure conditions.

WO 2015/024236 publication reports olefins and acrylates can be copolymerized in the presence of a soluble Lewis acid to obtain a high molecular weight copolymer with high olefin content. The publication further reports that copolymers with UV crosslinkable benzophenone can be obtained by this copolymerization method; however, obtaining copolymers with thermally crosslinkable functionality, such as hydroxyl group, is generally considered not feasible due to the Lewis acid's reactivity toward the free hydroxyl group. The interaction between the free hydroxyl group and the Lewis acid is detrimental to the catalytic turnover in the reaction. In addition, Lewis acid interaction with a free multiple hydroxyl group would result in a gel or gel-like material during the polymerization, limiting the efficiency of copolymerization.

There is a need in the art for olefin-acrylate copolymers and method of making the copolymer possessing pendant hydroxyl functionality, which can be further subjected to controlled crosslinking with crosslinkers such as multifunctional isocyanates, anhydrides or metal chelates. The current invention fulfills this need.

BRIEF SUMMARY OF THE INVENTION

The invention provides copolymers having a backbone of polar vinyl monomers and non-polar alkene monomers, with pendant hydroxyl functional groups, and methods of preparing the copolymers. The copolymer have high olefin content, which is beneficial for optical clarity and moisture barrier properties. The pendant hydroxyl functionalities can be further crosslinked.

One embodiment of the invention is directed to a copolymer prepared by a reaction of (A) 10-90 mol % of an unactivated olefin; (B) 10-90 mol % of an activated olefin, and (C) 10-50 mol % of a hydroxyl functional activated olefin and/or a hydroxyl functional unactivated olefin. The copolymer comprises a plurality of pendant hydroxyl groups with backbone of unactivated olefin and activated olefin chain. Depending upon molar ratio, the backbone chain is an alternating type or a random copolymer. Preferably, the backbone chain is a random copolymer. The copolymer's weight average molecular weight (Mw) is from about 500 to about 2,000,000.

Another embodiment of the invention is directed to a method of forming an activated olefin and an unactivated olefin copolymer with pendant hydroxyl functionality comprising the steps of:
(1) pre-complexing a first amount of the activated olefin and a Lewis acid to form a pre-complex,
(2) adding the pre-complex to a solution of (i) the unactivated olefin, (ii) a second amount of the activated olefin and (iii) a hydroxyl functional activated olefin and/or a hydroxyl functional unactivated olefin in (iv) a solvent to form a mixture; and
(3) polymerizing the mixture in a temperature range of −78° C. to 100° C.;
wherein the first amount is an equimolar amount of the activated olefin with the Lewis acid and the second amount is the rest of the molar amount of the activated olefin.

The amount of the Lewis acid ranges from about 1 to about 99 mol % of the activated olefin.

Another embodiment of the invention is directed to a pressure sensitive hot melt adhesive comprising: (i) a copolymer having a backbone of olefin-acrylate and a plurality of pendant hydroxyl functionality off of the backbone; and (ii) optionally, a tackifier, plasticizer, antioxidant, inorganic fillers, desiccants and/or adhesion promoter. The copolymer has a weight average molecular weight of about 500 to about 2,000,000 Daltons. The copolymer and the pressure sensitive hot melt adhesive are optically clear.

These and other aspects of the invention are described in the detailed description below. In no event should the above summary be construed as a limitation on the claimed subject matter which is defined solely by the claims as set forth herein.

DETAILED DESCRIPTION OF THE INVENTION

All documents cited herein are incorporated in their entireties by reference.

As used herein, a "polymer," a "copolymer," and a "terpolymer" used interchangeably, is a molecular complex that consists of monomer units greater than about 15 monomer units.

The total mol % of the copolymer is 100 mol % of the reactants.

As used herein, the term "optically clear" or "optical clarity" refers to transparency to light according to the naked eye.

As used herein, the terms "optically clear adhesive" refer to an adhesive that has optical clarity.

As used herein, the terms "pressure sensitive hot melt adhesive" refers to a viscoelastic material which adheres instantaneously to most substrates with an application of slight pressure and remains permanently tacky.

The present invention relates to a copolymer having a backbone of polar vinyl monomers and non-polar alkene monomers, with pendant hydroxyl functional groups, and methods of preparing the copolymer. The pendant hydroxyl functional group on the copolymer backbone can be further reacted with crosslinkers, such as multifunctional isocyanates, anhydrides or metal chelates. The copolymer is prepared by copolymerizing an unactivated olefin, an activated olefin, and a hydroxyl functional activated olefin. One reaction scheme is shown below with a hydroxyl functional activated olefin.

where $R_1$, $R_3$ and $R_4$ are alkyl, aryl or aralkyl groups; $R_2$ & $R_5$ are a hydrogen or a methyl group; $EtAlCl_2$ is ethylaluminum dichloride; and BPO is benzoyl peroxide.

The copolymer can also be obtained by copolymerizing (1) an unactivated olefin, (2) an activated olefin and (3) a hydroxyl functional unactivated olefin and/or a hydroxyl functional activated olefin. Another schematic reaction is shown below with a hydroxyl functional unactivated olefin:

where $R_1$, $R_3$, $R_4$ are alkyl, aryl or aralkyl groups; $R_2$ is a hydrogen or a methyl group; $R_5$ is H, methyl, alkyl, cycloalkyl, aralkyl or aryl groups; X is a spacer, which can be a linear or branched alkyl, cycloalkyl or aryl group optionally containing heteroatoms; $EtAlCl_2$ is ethylaluminum dichloride; and; BPO is benzoyl peroxide.

The unactivated olefin is selected from the group consisting of an unsubstituted alkene, a monosubstituted alkene, a disubstituted alkene and a trisubstituted alkene. About 10 to about 90 mol % of the unactivated olefin is added in the reaction.

Non-limiting examples of suitable unactivated olefins are ethylene, propylene, 1-butene, 1-pentene, 1-hexene, 1-heptene, 1-octene, 1-nonene, 2-methyl-peneten, 3-methyl-1-butene, isobutylene, diisobutylene, 2-methyl-1-pentene, 3-methyl-1-pentene, 4-methyl-1-pentene, 1,1-dimethylpentene, vinylcyclohexane, cyclopropene, cyclobutene, cyclopentene, cyclohexene, norbornene, limonene, -pinene, β-pinene, camphene, cis-cyclooctene and trans-cyclooctene.

In one particularly useful aspect of the invention, the unactivated olefin is selected from ethylene, propylene, 1-butene, 1-pentene, 1-hexene, 1-heptene, 1-octene, 2-methylpentene, 3-methyl-1-butene, isobutylene or diisobutylene.

Non-limiting examples of suitable activated olefins are (meth)acrylate, acrylonitrile, (meth)acrylamide, maleimide, itaconimide, citroconimide, maleic anhydride, cyanoacrylate, maleate, fumarate, crotonates and cinnamates. About 10 to about 90 mol % of the activated olefin is added in the reaction.

In one embodiment, the activated olefin is a (meth)acrylate wherein said (meth)acrylate is represented by the formula $H_2C=C(G)CO_2R$, where G may be hydrogen, halogen or alkyl of 1 to 6 carbon atoms, and R may be selected from alkyl, cycloalkyl, alkenyl, cycloalkenyl, alkaryl, aralkyl or aryl groups of 1 to 16 carbon atoms, any of which may be optionally substituted or interrupted as the case may be with the moiety selected from the group consisting of silane, silicon, oxygen, halogen, carbonyl, hydroxyl, ester, carboxylic acid, urea, urethane, carbamate, amine, amide, sulfur, sulfonate and sulfone and combinations thereof.

Non-limiting examples of suitable (meth)acrylates are methyl(meth)acrylate, ethyl(meth)acrylate, butyl(meth)acrylate, isobutyl(meth)acrylate, 2-ethylhexyl(meth)acrylate, isooctyl(meth)acrylate, glycidyl(meth)acrylate, cyclohexyl(meth)acrylate, isobornyl(meth)acrylate, benzyl(meth)acrylate, 2-hydroxy(meth)acrylate, trimethoxybutyl(meth)acrylate, ethylcarbitol(meth)acrylate, phenoxyethyl(meth)acrylate, 2-hydroxyethyl(meth)acrylate, trimethylolpropanetri(meth)acrylate, tetramethylolmethane tetra(meth)acrylate, pentaerythritol hexa(meth)acrylate, pentaerythritol tetra(meth)acrylate, dipentadierythritol monohydroxy penta(meth)acrylate, dipentaerythritol hexa(meth)acrylate, 1,4-butyleneglycol di(meth)acrylate, 1,6- hexanediol di(meth)acrylate, polyethyleneglycol di(meth) acrylate and oligoester(meth)acrylate.

In one particularly useful aspect of the invention, the (meth)acrylate is methyl(meth)acrylate, ethyl(meth)acrylate, butyl(meth)acrylate, isobutyl(meth)acrylate, 2-ethylhexyl(meth)acrylate, isooctyl(meth)acrylate, glycidyl(meth) acrylate or cyclohexyl(meth)acrylate.

In one particularly useful aspect of the invention, the activated olefin is selected from methyl acrylate or n-butyl acrylate, and the unactivated olefin is selected from 2-methylpentene, isobutylene, 1-octene or 1-hexene.

In one embodiment, the hydroxyl functional activated olefin is an activated olefin with a hydroxyl functional group in the structure. The activated olefin can be (meth)acrylate, acrylonitrile, (meth)acrylamide, maleimide, itaconimide, citroconimide, maleic anhydride, cyanoacrylate, maleate, and fumarate with a hydroxyl functional group in the structure. About 1 to about 50 mol % of the hydroxyl functional activated olefin is added in the reaction.

Non-limiting examples of the hydroxyl functional activated olefin are 2-hydroxyethyl (meth)acrylate, 4-hydroxybutyl (meth)acrylate, 2-hydroxypropyl (meth)acrylate, 3-hydroxypropyl (meth)acrylate, 2-hydroxyethyl maleimide.

In one embodiment, the hydroxyl functional unactivated olefin is an olefin with a hydroxyl functional group in the structure. About 1 to about 50 mol % of the hydroxyl functional unactivated olefin is added in the reaction.

Nonlimiting examples of the hydroxyl functional unactivated olefin include 4-penten-1-ol, 5-hexene-1-ol, allyl alcohol, 3-butene-1-ol, 9-decene-1-ol, 10-undecene-1-ol.

A solvent is generally not necessary for the reaction to proceed if the reactants are in a liquid form and soluble enough in each other as well as to dissolve the Lewis acid sufficiently for the reaction to proceed. However, if a solvent is desired, suitable solvent may be selected from a hydrocarbon, halogenated hydrocarbon, alkyl ester (e.g. ethyl acetate, butyl acetate and the like) or mixtures thereof. Non-limiting examples of suitable solvents include toluene, xylene, benzene, n-hexane, n-heptane, chlorobenzene, methylene chloride, 1,2-dichloroethane, cyclohexane, methyl cyclohexane, ethyl acetate, butyl acetate, propyl acetate and mixtures thereof. A particularly preferred solvent is toluene. It is preferable to use high levels of solvent to prevent gelation and/or break the gelation during polymerization. Solvent dilution greater than about 50% of the solids is preferable.

A coordinating solvent may be further added to aid solubility of reactants during the reaction. The coordinating solvent is any solvent that contains an ester or ether functionality. Non-limiting examples of the coordinating solvent are butyl acetate, ethyl acetate, propyl acetate, tetrahydrofuran, 1,4-dioxane, and methyltetrahydrofuran.

The reaction is performed in the presence of a Lewis acid catalyst.

Examples of Lewis acid include, but not limited to, boron trifluoride, ethylboron dichloride, boron triboromide, boron triiodide, aluminum trichloride, aluminum tribromide, ethyl aluminum dichloride, ethylaluminum sesquichloride, diethyl aluminum chloride, stannic chloride, zinc dichloride, copper dichloride, and nickel chloride; or a Lewis acid of triflate compounds, such as aluminum triflate, scandium triflate, copper triflate, yttrium triflate, and zinc triflate, or a mixture thereof. Lewis acid can also be an inorganic or organic metal compound whose cation is selected from the group consisting of scandium, titanium, vanadium, chrome, manganese, iron, cobalt, copper, zinc, boron, aluminum, yttrium, zirconium, niobium, molybdenum, cadmium, rhenium, and tin.

For example, such inorganic or organic metal compound can be $ZnBr_2$, $ZnI_2$, $ZnCl_2$, $ZnSO_4$, $CuCl_2$, $CuCl$, $Cu(O_3SCF)$, $CoCl_2$, $CoI_2$, $FeI_2$, $FeCl_3$, $FeCl_3$, $FeCl_2(THF)$, $TiCl_3$ (THF), $TiCl_4$, $TiCl_3$, $ClTi(O$-i-propyl) $MnCl_2$, $ScCl_3$, $AlCl_3$, $(C_8H_{17})AlCl_2$, $(C_8H_{17})_2AlCl$, $(i$-$C_4H_9)_2AlCl$, $(C_6H_5)_2AlCl$, $(C_6H_5)AlCl_2$, $ReCl_5$, $ZrCl_4$, $NbCl_5$, $VCl_3$, $CrCl_2$, $MoCl_5$, $YCl_3$, $CdCl_2$, $LaCl_3$, $Er(O_3SCF_3)_3$, $Yb(O_2CCF_3)_3$, $SmCl_3$, $B(C_6H_5)$ and $TaCl_5$, disclosed in U.S. Pat. Nos. 6,127,567; 6,171,996; and 6,380,421. The inorganic or organic metal compound can also be a metal salt, such as $ZnCl_2$, $COCl_2$ and $SnCl_2$; an organometallic compound, such as $RAlCl_2$, $RSnO_3SCF_3$ and $R_3B$ (R is an alkyl group or an aryl group), disclosed in U.S. Pat. Nos. 3,496,217; 3,496,218; and 4,774,353.

The inorganic or organic metal compound may comprise an anionic moiety selected from the group consisting of halides, such as fluorides, chlorides, bromides, and iodides; triflates; low aliphatic anions having 2 to 7 carbons; $HPO_3^{2-}$; $H_3PO^{2-}$; $CF_3COO^-$; $C_7H_{15}OSO^{2-}$; or $SO_4^{2-}$, and a cation metal moiety selected from the group consisting of zinc, cadmium, beryllium, aluminum, gallium, indium, thallium, titanium, zirconium, hafnium, erbium, germanium, tin, vanadium, niobium, scandium, chrome, molybdenum, tungsten, manganese, rhenium, palladium, thorium, iron, and cobalt, preferably the group consisting of zinc, cadmium, titanium, tin, chrome, iron, and cobalt, disclosed in U.S. Pat. No. 3,773,809.

U.S. Pat. No. 3,773,809 disclosed examples of a cocatalyst, including borohydride, organic borohydride, and a boronic salt such as $R_3B$ or $B(OR)_3$ (where R is selected from hydrogen, a $C_6$-$C_{18}$ aryl group, an aryl group substituted with a $C_1$-$C_7$ alkyl group, an aryl group substituted with a cyano-substituted $C_1$-$C_7$ alkyl group, preferably triphenylborone).

The Lewis acid used in the present invention can be a cocatalyst disclosed in U.S. Pat. Nos. 3,496,217; 3,496,218; 4,774,353; 4,874,884; 6,127,567; 6,171,996; and 6,380,421.

Preferably, Lewis acid catalyst is a metal salt, preferably metal halide, such as fluorides, chlorides, bromides, and iodides, and preferably chlorides, and amongst the aluminum trichloride, alkyl aluminum chloride, zinc chloride, iron chloride(II), and iron chloride(III) are preferable. Non-limiting examples of suitable Lewis acids include $EtAlCl_2$ (ethylaluminum dichloride), ethylaluminum sesquichioride, $Et_2AlCl$ (diethylaluminum chloride), $ZnCl_2$, $AlCl_3$, $AlBr_3$, $BF_3$, $TiCl_4$ and combinations thereof. The choice of the Lewis acid depends on any solvent selected for the reaction since solubility of the Lewis acid in that particular solvent should be taken into consideration. A particularly preferred Lewis acid is $EtAlCl_2$.

In the method of preparing the copolymer, an amount of the Lewis acid can be in the mole range of 1 mole to 99 mole %, preferably from about 5 to about 20 mol %, of the activated olefin monomer.

The activated olefin and the Lewis acid catalyst are ideally pre-complexed to form a mix prior to the addition of the copolymerization reactant mixture.

A free radical initiator is not always necessary for the polymerization reaction to proceed. Thus, it was found that the polymerization reaction could be performed with an initiator as well as without initiator to satisfactory and desired yields, conversion and molecular weights. If an initiator is used, suitable radical initiators may be selected from the group consisting of benzoyl peroxide, methyl ethyl ketone peroxides, di-t-butyl peroxide, di-t-amyl peroxide, dicumyl peroxide, diacyl peroxide, decanoyl peroxide, lauroyl peroxide, 2,4-dichlorobenzoyl peroxide, t-butyl perbenzoate, cumene hydroperoxide (CHP), 2,5-bis (t-butylperoxy) 2,5-dimethylhexane, peroxydicarbonates, peroxyesters, dialkyl peroxides, hydroperoxide, peroxyketals, 4,4'-azobis(4-cyanovaleric acid), 1,1'-azobis(cyclohexanecarbonitrile), 2,2'-azobisisobutyronitrile ("AIBN"), and mixtures thereof. A particularly preferred initiator in such cases is benzoyl peroxide (BPO). Free radical initiators may be incorporated in any amounts useful to achieve the desired reaction or cure. Desirably, they are present in amounts of about 0.01% to about 10% by weight of the total composition. Combinations of the free-radical initiators are also useful.

In the method using Lewis acid as described above, high pressure is not required. However, pressure may be used for gaseous unactivated olefin reactants, e.g., ethylene, propylene. The reaction condition of the present invention may be in a pressure of 5-200 bar, preferably 20-50 bar. When the pressure is less than 5 bar, the amount of the 1-alkene is low in the polymer. On the other hand, when the pressure is greater than 200 bar, an additional device in process is required.

Temperature may also be varied to form the copolymers of different molecular weights. Preferably, the reaction is conducted at temperature range of about 0° C. or greater. Reaction temperature of 0° C. or greater prevents gelation or breaks up the gel during polymerization.

Another embodiment is directed to a method of forming a copolymer with pendant hydroxyl functionality from an activated olefin and an unactivated olefin comprising the steps of:
(1) pre-complexing a first amount of the activated olefin and a Lewis acid,
(2) adding the precomplex to a solution of a second amount of the activated olefin, the unactivated olefin and a hydroxyl functional activated olefin in a solvent; and
(3) polymerizing the mixture in a temperature range of −78° C. to 100° C.; wherein the first amount is an equimolar amount of the activated olefin with the Lewis acid and the second amount is the rest of the molar amount of the activated olefin.

The amount of the Lewis acid ranges from about 1 to about 99 mol %, preferably from about 5 to about 20 mol % of the activated olefin.

In another embodiment, a free radical initiator may optionally be added at the end of step (2) and just prior to step (3) of the above method.

Another embodiment is directed to a method of forming a copolymer with pendant hydroxyl functionality from an activated olefin and unactivated olefin comprising the steps of:
(1) pre-complexing a first amount of the activated olefin and a Lewis acid,
(2) adding the precomplex to a solution of a second amount of the activated olefin, the unactivated olefin and a hydroxyl functional unactivated olefin in a solvent; and
(3) polymerizing the mixture in a temperature range of −78° C. to 100° C.;
wherein the first amount is an equimolar amount of the activated olefin with the Lewis acid and the second amount is the rest of the molar amount of the activated olefin.

The amount of the Lewis acid ranges from about 1 to about 99 mol %, preferably from about 5 to about 20 mol % of the activated olefin.

In another embodiment, a free radical initiator may optionally be added at the end of step (2) and just prior to step (3) of the above method.

Relatively high weight average molecular weight (Mw) copolymer, in the rage of about 500 to about 2,000,000, can be obtained after acidic work-up of the reaction. The copolymer is optically clear. In some embodiments, the copolymer has a light transmission of 90% or greater measured in accordance with ASTM E903 at 500 nm.

Gelation during polymerization can be minimized or broken by copolymerizing (a) at higher temperatures (0° C. or above), (b) at higher dilution with solvent and/or (c) with a coordinating solvent to the reaction. If the copolymerization is conducted without considering temperature, dilution and/or coordinating solvent, the copolymerization reaction can result in a gel-like material. It is believed that the gelation comes either from the reaction of the hydroxyl functional activated olefin or the hydroxyl functional unactivated olefin with the Lewis acid, resulting in a precipitated salt or from salt of the resulting copolymer.

Another embodiment is directed to a pressure sensitive hot melt adhesive comprising a copolymer having a backbone of olefin-acrylate and pendant hydroxyl functionalities. The pressure sensitive hot melt adhesive optionally includes a tackifier, plasticizer, antioxidant, inorganic fillers, desiccants and/or adhesion promoters. The choice of the optional components and the amounts may be varied for desired properties. The optional components may be selected to enhance the optical transparency of the adhesive.

Tackifiers should be chosen to be compatible with the copolymer of the adhesive. Preferable tackifiers include synthetic hydrocarbon resins derived from petroleum, aliphatic olefin derived resins such as those available from Goodyear under the WINGTACK tradename and the ESCOREZ 1300 series from Exxon. A common $C_5$ tackifying resin in this class is a diene-olefin copolymer of piperylene and 2-methyl-2-butene having a softening point of about 95° C. This resin is available commercially under the tradename WINGTACK 95. The resins normally have ring and ball softening points as determined by ASTM method E28 between about 20° C. and 150° C. Also useful are $C_9$ aromatic/aliphatic olefin-derived resins available from Exxon in the Escorez 2000 series. Hydrogenated hydrocarbon resins are especially useful when the long term resistance to oxidation and ultraviolet light exposure is required. These hydrogenated resins include such resins as the Escorez 5000 series of hydrogenated cycloaliphatic resins from Exxon, hydrogenated $C_9$ and/or $C_5$ resins such as ARKON P series of resins by Arakawa Chemical, hydrogenated aromatic hydrocarbon resins such as REGALREZ 1018, 1085 and the REGALITE R series of resins from Hercules Specialty Chemicals. Other useful resins include hydrogenated polyterpenes such as CLEARON P-105, P-115 and P-125 from the Yasuhara Yushi Kogyo Company of Japan.

The tackifying resin will be present at a level of from 0 to 50% by weight of the pressure adhesive composition.

Suitable plasticizers are medicinal white oils, naphthenic mineral oils, adipates, polypropylene oligomers, polybutene oligomers, polyisoprene oligomers, hydrogenated polyisoprene and/or polybutadiene oligomers, benzoate esters, vegetal or animal oils and their derivatives, sulfonic acid esters, mono or polyhydric alcohols, polyalkylene glycols having a molecular weight of 200 to 6000 g/mol, such as polypropylene glycol or polybutylene glycol. In particular, oily plasticizer components are added. The plasticizer component is preferably a liquid at room temperature, for example hydrocarbon oils, polybutene/polyisoprene oligomers, hydrogenated naphthenic oils or vegetal oils. In one embodiment, esters are partially comprised as the plasticizer in addition to the oily plasticizers. They are for example liquid polyesters and glycerine esters, such as glycerine diacetate and glycerine triacetate, glycerine tribenzoate, neopentyl glycol dibenzoate, pentaerythritol tetrabenzoate and 1,4-cyclohexanedimethanol dibenzoate. Preferably, plasticizers based on aromatic dicarboxylic acid esters are employed, e.g. the diesters of phthalic acid, isophthalic acid or terephthalic acid. The alcohol moiety of these esters used as plasticizers normally contains 2 to 20 carbon atoms. Exemplary esters of this type are diallyl phthalate, dibutyl phthalate, dicyclohexyl-, dimethylcyclohexyl-, diisoheptyl-, diethylhexyl-, dioctyl-, diisononyl-, diisodecyl phthalate. In particular, these plasticizers should have a high boiling point, for example above 250° C. at normal pressure. Esters of phthalic acid of alcohols containing 8 to 16 carbon atoms are particularly suitable.

The amount of the ester-based plasticizer should be added up to 35%, especially up to 25 wt %.

Examples of adhesion promoters that are useful include, but are not limited to, trialokysilanes, phosphate esters, and derivatives thereof.

The formulated adhesive may also include, fillers, desiccants, antioxidants, UV stabilizers, preservatives, emollients, excipients, opacifiers, as well as other components or additives.

The inorganic fillers may be used to improve the cohesive strength, rheology, and moisture and oxygen barrier properties of the adhesives. Representative fillers include, but are not limited to, ground quartz, fused silica, amorphous silica, talc, clay, glass beads, graphite, carbon black, alumina, metal powders, clays, graphene, nanoclay, mica, aluminum nitride, and boron nitride.

The desiccants may also be added to enhance the moisture and oxygen barrier properties of the adhesive. A representative list of such desiccants can be found in Dean, J. Lange's Handbook of Chemistry, 1999, McGraw Hill, Inc., New York, N.Y., pp. 11.5. In general, suitable desiccants include metal oxides, such as, CaO, BaO, MgO; other oxides, such as $SiO_2$, $P_2O_5$, $Al_2O_3$; metal hydrides, such as $CaH_2$, NaH, $LiAlH_4$; metal salts, such as $CaSO_4$, $Na_2SO_4$, $MgSO_4$, $CaCO_3$, $K_2CO_3$, and $CaCl_2$); powdered zeolites, such as 4A and 3A molecular sieves; metal perchlorates, such as, $Ba(ClO_4)_2$, $Mg(ClO_4)_2$; superabsorbent polymers, such as, lightly cross linked poly(acrylic acid); and metals that react with water, such as calcium. The desiccants are capable of reacting with, absorbing, or adsorbing water and/or water vapor.

Suitable antioxidant include butylated hydroxytoluene, hydroquinone, methylhydroquinone, 4-methoxyphenol. Also, high molecular weight hindered phenols and multifunctional phenols such as sulfur and phosphorous-containing phenol are also useful as antioxidants. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include; 1,3,5-trimethyl-2,4,6-tris-{3,5-di-tert-butyl-4-hydroxybenzylybenzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis (2,6-tert-butyl-phenol); 4,4'-thiobis (6-tert-butyl-o-cresol); 2,6-di-tθrtbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate].

The pendant hydroxyl functional group on the copolymer backbone can be further reacted with crosslinkers, such as multifunctional isocyanates, anhydrides or metal chelates.

In yet another embodiment, the present invention includes materials or articles formed with the pressure sensitive hot melt adhesive of the invention. Non-limiting examples of such materials and articles include pressure sensitive barrier adhesive and polyurethane barrier adhesives.

The copolymer of the above is optically clear. In some embodiment, the copolymers have a light transmission of 90% or greater measured in accordance with ASTM E903 at 500 nm. Adhesives made with these copolymers and other optically clear additives are also considered to be optically clear. In some embodiments, adhesives made with these copolymers have a light transmission of 90% or greater, measured in accordance with ASTM E903 at 500 nm.

The optically clear adhesive can be used as adhesives in display devices, including flexible and foldable displays, outdoor displays, LCD displays, LED displays; diffusers; rigid compensators; heaters; flexible polarizers; touchscreens; flexible thin film photovoltaic cells; mobile phone; tablet PC; TV; notebook PC; digital camera; photo frame; car navigation; and the like.

EXAMPLES

Example 1: Copolymerization of n-butyl acrylate, 2-hydroxyethyl acrylate and 1-octene In a two liter, 4-necked round bottom flask fitted with a mechanical stirrer, a thermometer, a condenser and nitrogen inlet, 1-octene (450 g, 4 mol), n-butyl acrylate (BA) (102.78 g, 0.8 mol), benzoyl peroxide (2.43 g, 10 mmol), and 2-hydroxyethyl acrylate (HEA) (4.65 g, 40 mmol) in toluene (275 mL) were added. The contents in the flask were stirred under nitrogen at room temperature. In a second round bottom flask with a nitrogen inlet, n-butyl acrylate (25.68 g, 0.2 mol) and toluene (27 mL) were added. Nitrogen was purged through the second flask, and the mixture was cooled using an ice-water bath. A 25 wt % solution of $EtAlCl_2$ (ethylaluminum dichloride, Lewis acid) in toluene (101.79 g, 0.2 mol) was added to the second flask using a syringe. The flask was swirled to ensure thorough mixing of the contents. After about 5 minutes, the second contents were transferred through a syringe to the first reaction flask. The reaction mixture was stirred at room temperature overnight. Additional toluene (500 mL) was added and the Lewis acid catalyst and the alkoxy salts were quenched with the addition of 10% aqueous HCl until the pH of the aqueous layer was about 2. The layers were separated and the organic layer was washed twice with water and dried over anhydrous sodium sulfate. The solvent and the volatiles were removed using rotovap (rotary evaporator) under reduced pressure. The residual monomers were removed by precipitating the polymer in methanol. This resultant copolymer was a paste. Toluene, butyl acetate, cyclohexane or a mixture was used as the solvent for the above copolymerization.

Typical yield of the copolymer was about 70-80%.

Figure 1:
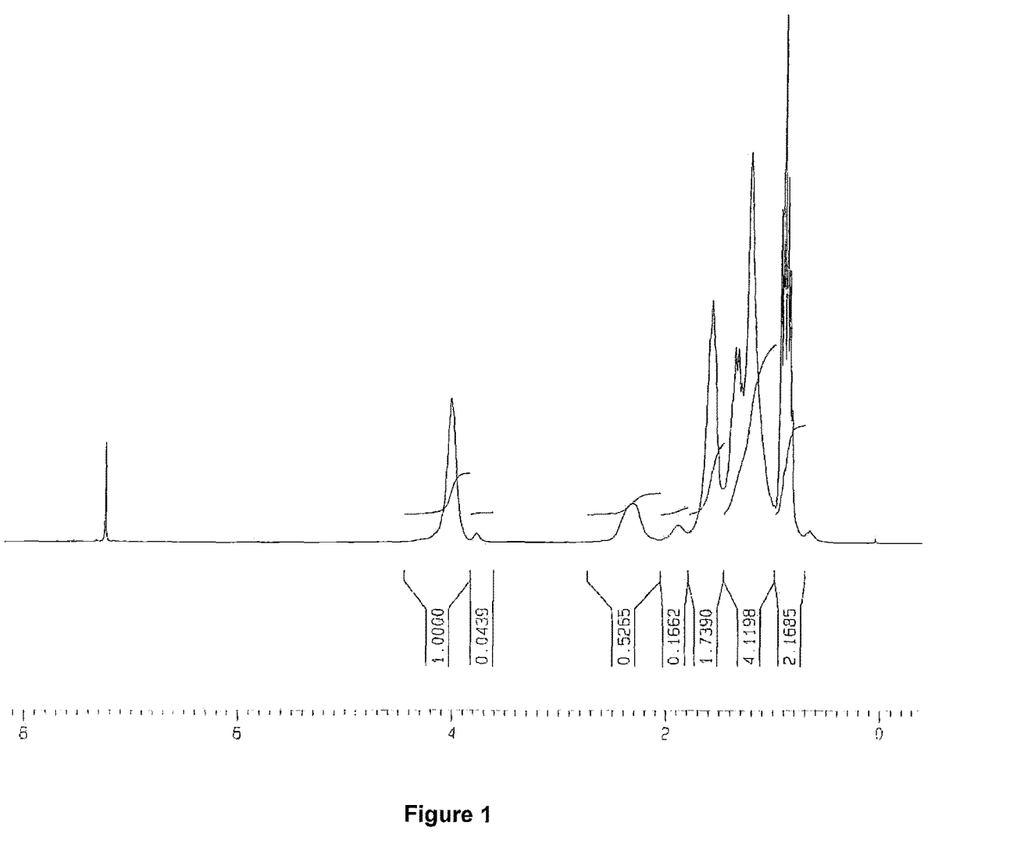
FIG. 1 is a $^1$H NMR spectrum of the copolymer of n-butyl acrylate, 2-hydroxyethyl acrylate and 1-octene.

FIG. 1 is $^1$H NMR spectrum indicates that the terpolymer was formed with n-butyl acrylate, 1-octene and 2-hydroxyethyl acrylate. Methylene protons of n-butyl acrylate at δ4.0 ppm, the methylene protons of 2-hydroxyethyl acrylate at δ 3.8 ppm and the methyl protons of 1-octene at δ 0.8 ppm were used for quantitation.

Figure 2:
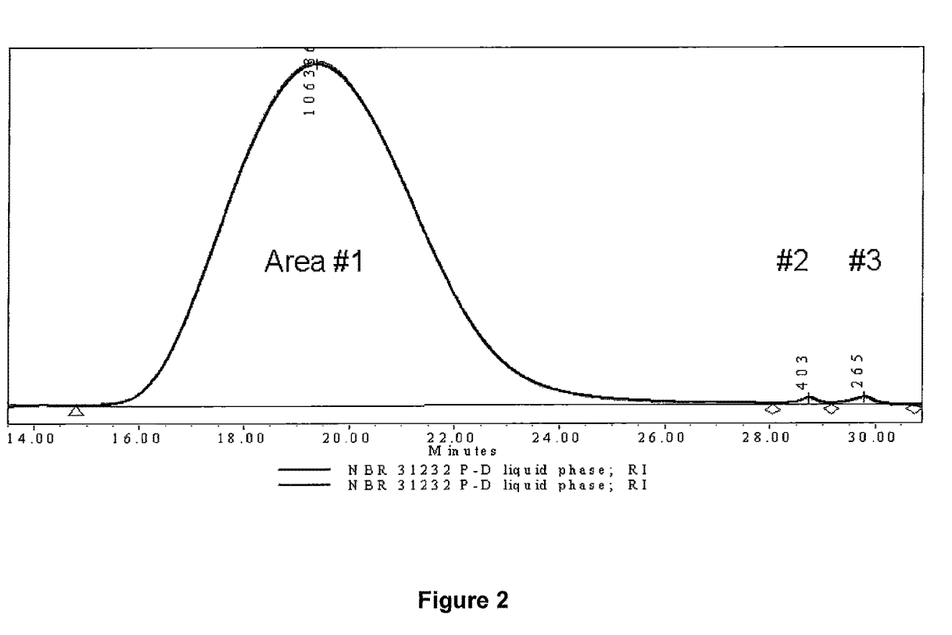
FIG. 2 is a sample GPC profile of the copolymer of n-butyl acrylate, 2-hydroxyethyl acrylate and 1-octene in tetrahydrofuran.

FIG. 2 shows a GPC trace for 2-hydroxyethyl acrylate, n-butyl acrylate and 1-octene terpolymer. The GPC shows a monomodal distribution with the highest peak around 106,033 as the weight average molecular weight.

Seven polymerization examples are listed in Table 1 to show the effects of the solvent, including coordinating solvent, polymerization reaction temperature and varying ratios of the monomers. The weight average molecule weight (Mw), PDI (polydispersity index), and the percent of the monomer content in the polymer is also listed in Table 1 for each of the polymer.

TABLE 1

| Polymer Sample | Monomers/conditions | Mw/PDI (g/mol) | % of acrylate:1-octene:HEA in the copolymer |
|---|---|---|---|
| 1 | 1-octene(4eq), BA(1eq), HEA(0.04eq), EtAlCl$_2$ (25 wt % solution in toluene, 0.2eq), in toluene-butyl acetate(3:1), −40° C. | 200,000/4.3 | 60:36:4 |
| 2 | 1-octene(2eq), BA(1eq), HEA(0.04eq), EtAlCl$_2$ (25 wt % solution in toluene, 0.1eq), in cyclohexane, 0° C. | 142,000/9.2 | 64:32:4 |
| 3 | 1-octene(4eq), BA(1eq), HEA(0.04eq), EtAlCl$_2$ (25 wt % solution in toluene, 0.2eq), in toluene, RT | 124,000/3.0 | 52:46:2 |
| 4 | 1-octene(4eq), BA(1eq), HEA(0.04eq), EtAlCl$_2$ (25 wt % solution in toluene, 0.2eq), in toluene-butyl acetate(3:1), RT | 84,000/2.6 | 51:47:2 |
| 5 | 1-octene(2eq), BA(1eq), HEA(0.03eq), EtAlCl$_2$ (25 wt % solution in toluene, 0.1eq), in cyclohexane, 0° C. | 261,329/5.4 | 56:42:2 |
| 6 | 1-octene(4eq), 2-EHA(1eq), HEA(0.1eq), EtAlCl$_2$ (25 wt % solution in toluene, 0.2eq), in toluene-butyl acetate(3:1), 0° C. | 271,551/9.9 | 65:30:5 |
| 7 | 1-octene(2eq), BA(1eq), HEA(0.05eq), EtAlCl$_2$ (25 wt % solution in toluene, 0.1eq), in cyclohexane, 0° C. | 273,041/12 | 64:33:3 |
| A | 1-octene(2eq), BA(1eq), HEA(0.05eq), EtAlCl$_2$ (25 wt % solution in toluene, 0.1eq), in heptane, 0° C. | Gelled during polymerization | |
| B | 1-octene(4eq), BA(1eq), HEA(0.04eq), EtAlCl$_2$ (25 wt % solution in toluene, 0.2eq), in toluene, −40° C. | Gelled during polymerization | |

Comparative samples A and B resulted in a gel-like material from the interaction of the Lewis acid with the hydroxyl functionality of the monomer or copolymer in a poor solvent (heptane) or low reaction temperature (−40° C.) for this copolymerization.

In the inventive polymer samples 1-7, polymerization conditions with higher temperatures (0° C. or RT), higher dilution and/or coordinating solvent, such as butyl acetate, prevented gelation during polymerization.

Table 1 summarizes that, generally, good 2-hydroxyethyl acrylate incorporation was observed in copolymerization conditions of 1-7. Also, at least two equivalents of 1-octene (over n-BA or 2-EHA) must be used to incorporate higher level of 1-octene in the resultant polymer.

Sample 6 showed the copolymerization using 2-EHA (2-ethylhexyl acrylate) as the main acrylate monomer. The result was comparable to that observed with n-BA (n-butyl acrylate) as the acrylate monomer.

The use of coordinating solvent such as butyl acetate generally lowered 1-octene incorporation even when excess 1-octene (4eq) was used (Samples 1 and 6). The results indicated that the molecular weights and olefin incorporation can be tuned with the use of higher temperatures (0° C. or RT), higher dilution and/or a coordinating solvent.

Samples 1-7 were clear, colorless, and transparent to the naked-eye.

Film samples were made by dissolving the polymer samples with multifunctional isocyanates and catalytic amount of tin catalyst in a solvent. The films were cast onto a substrate backing and cured. The films were diced, and when examined, they were clear, colorless, and transparent to the naked-eye.

Example 2: Copolymerization of n-butyl acrylate, 2-hydroxyethyl methacrylate and 1-octene In a one-liter 4 necked round bottom flask fitted with a mechanical stirrer, thermometer, condenser and nitrogen inlet, 1-octene (150 g, 1.34 mol), n-butyl acrylate (34.26 g, 0.27 mol), benzoyl peroxide (0.81 g, 3 mmol), and 2-hydroxyethyl methacrylate (HEMA) (0.87 g, 6 mmol) and toluene (91 mL) were added. The contents were stirred under nitrogen at room temperature. In a second round bottom flask with a nitrogen inlet, n-butyl acrylate (8.56 g, 66 mmol) and toluene (9 mL) were added. Nitrogen was purged through the second flask, and the mixture was cooled using an ice-water bath. A 25 wt % solution of EtAlCl$_2$ in toluene (36.6 mL, 66 mmol) was added to the second flask with a syringe. The second flask was swirled to ensure thorough mixing of the contents. After about 5 minutes, the contents from the second flask were transferred through a syringe to the main reaction flask. The reaction mixture was stirred at room temperature overnight. Additional toluene (200 mL) was added and the Lewis acid catalyst and the alkoxy aluminum salts were quenched by the addition of 10% aqueous HCl until the pH of the aqueous layer was about 2. The layers were separated and the organic layer was washed twice with water and dried over anhydrous sodium sulfate. The solvent and the volatiles were removed using rotovap under reduced pressure. The residual monomers were removed by precipitating the polymer in methanol. This resultant copolymer was a paste.

Temperature of the reaction was varied and the weight average molecule weight (Mw), PDI (polydispersity index), and the percent of the monomer content in the copolymers are listed in Table 2.

TABLE 2

| Sample | Monomers/conditions | Mw/PDI | % composition of acrylate:1-octene:HEMA |
|---|---|---|---|
| 8 | 1-octene(4eq), BA(1eq), HEMA(0.02eq), EtAlCl$_2$ (25 wt % solution in toluene, 0.2eq), in toluene, −30° C. | 165,514/3.3 | 54:45:1 |
| 9 | 1-octene(4eq), BA(1eq), HEMA(0.02eq), EtAlCl$_2$ (25 wt % solution in toluene, 0.2eq), in toluene, RT | 123,644/3.0 | 53:46:1 |

Sterical hindrance of the methyl group of HEMA lowered the level of HEMA incorporation in copolymer samples 8 and 9. The results indicate hydroxyl group containing acrylates to be superior to corresponding methacrylate in these copolymerization.

Samples 8 and 9 were also clear, colorless, and transparent to the naked-eye.

Film samples made with Samples 8 and 9 (dissolved the polymer samples with multifunctional isocyanates and catalytic amount of tin catalyst in a solvent) were also clear, colorless, and transparent to the naked-eye.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

We claim:
1. A copolymer prepared by the reaction of:
   (A) 10-89 mol % of an unactivated olefin;
   (B) 10-89 mol % of an activated olefin; and
   (C) 1-50 mol % of a hydroxyl functional unactivated olefin selected from the group consisting of allyl alcohol, 3-buten-1-ol, 4-penten-1-ol, 5-hexen-1-ol, 9-decen-1-ol, 10-undecen-1-ol, and mixtures thereof;
   wherein the total mol % is 100 mol %;
   wherein the copolymer comprises a plurality of pendant hydroxyl groups; and
   wherein the weight average molecular weight (Mw) is from about 84,000 to about 2,000,000.

2. The copolymer of claim 1, wherein the unactivated olefin is selected from the group consisting of an unsubstituted alkene, monosubstituted alkene, disubstituted alkene, and trisubstituted alkene.

3. The copolymer of claim 1, wherein the unactivated olefin is selected from the group consisting of ethylene, propylene, 1-butene, 1-pentene, 1-hexene, 1-heptene, 1-octene, 1-nonene, 2-methyl-pentene, 3-methyl-1-butene, diisobutylene, diisobutylene, 2-methyl-1-pentene, 3-methyl-1-pentene, 4-methyl-1-pentene, dimethylpentene, vinylcyclohexane, cyclopropene, cyclobutene, cyclopentene, cyclohexane, norbornene, limonene, α-pinene, β-pinene, camphene, cis-cyclooctene and trans-cyclooctene.

4. The copolymer of claim 3, wherein the unactivated olefin is 2-methylpentene, isobutylene or 1-octene.

5. The copolymer of claim 1, wherein the activated olefin is selected from the group consisting of (meth)acrylate ester, acrylonitrile, (meth)acrylamide, maleimide, itaconimide, citroconimide, maleic anhydride, (meth)acrylate ester, maleate ester, fumarate ester, crotonates and cinnamates.

6. The copolymer of claim 5, wherein the (meth)acrylate is methyl(meth)acrylate, ethyl(meth)acrylate, butyl(meth)acrylate, isobutyl(meth)acrylate, 2-ethylhexyl(meth)acrylate, isooctyl(meth)acrylate, glycidyl(meth)acrylate, cyclohexyl(meth)acrylate, isobornyl(meth)acrylate, benzyl(meth)acrylate, 2-hydroxy(meth)acrylate, trimethoxybutyl(meth)acrylate, ethylcarbitol(meth)acrylate, phenoxyethyl(meth)acrylate, 2-hydroxy ethyl(meth)acrylate, trimethylolpropanetri(meth)acrylate, tetramethylolmethane tetra(meth)acrylate, pentaerythritol hexa(meth)acrylate, pentaerythritol tetra(meth)acrylate, dipentaerythritol monohydroxy penta(meth)acrylate, dipentaerythritol hexa(meth)acrylate, 1,4-butyleneglycol di(meth)acrylate, 1,6-hexanediol di(meth)acrylate, polyethyleneglycol di(meth)acrylate and oligoester(meth)acrylate.

7. The copolymer of claim 6, wherein the (meth)acrylate is methyl(meth)acrylate, ethyl(meth)acrylate, butyl(meth)acrylate, isobutyl(meth)acrylate, 2-ethylhexyl(meth) acrylate, isooctyl(meth)acrylate, glycidyl(meth)acrylate or cyclohexyl(meth)acrylate.

8. An adhesive comprising the copolymer of claim 1.

9. The adhesive of claim 8 further comprising a tackifier, plasticizer, filler, antioxidant, adhesion promoters, desiccants, UV stabilizers, preservatives, emollients, excipients, opacifiers or mixtures thereof.

10. A method of forming a copolymer having a backbone of olefin-acrylate with pendant hydroxyl functionality comprising the steps of:
   (1) pre-complexing a first amount of an activated olefin and a Lewis acid to form a pre-complex;
   (2) adding the pre-complex to a solution of (i) an unactivated olefin, (ii) a second amount of the activated olefin, and (iii) a hydroxyl functional unactivated olefin in (iv) a solvent to form a mixture; and
   (3) polymerizing the mixture in a temperature range of −78° C. to 100° C.;
   wherein the first amount of the activated olefin is an equimolar amount of the activated olefin with the Lewis acid, and the second amount of the activated olefin is the rest of the molar amount of the activated olefin;
   wherein the amount of Lewis acid ranges from about 1 to about 99 mol % of the activated olefin;
   wherein the copolymer is the reaction product of:
   (A) 10-89 mol % of an unactivated olefin;
   (B) 10-89 mol % of an activated olefin; and (C) 1-50 mol % of a hydroxyl functional unactivated olefin selected from the group consisting of allyl alcohol, 3-buten-1-ol, 4-penten-1-ol, 5-hexen-1-ol, 9-decen-1-ol, 10-undecen-1-ol, and mixtures thereof;

wherein the total mol % is 100 mol %;

wherein the copolymer comprises a plurality of pendant hydroxyl groups; and wherein the weight average molecular weight (Mw) is from about 84,000 to about 2,000,000.

11. The method of claim 10, wherein a coordinating solvent is added to the solution, wherein the coordinating solvent that has a heteroatom in the structure.

12. The method of claim 10, wherein a radical initiator is added after step (2) (iii) and before step (3).

13. The method of claim 10, wherein the unactivated olefin is selected from the group consisting of an unsubstituted alkene, monosubstituted alkene, disubstituted alkene, and trisubstituted alkene.

14. The method of claim 10, wherein the activated olefin is selected from the group consisting of (meth)acrylate, acrylonitrile, (meth)acrylamide, maleimide, itaconimide, citroconimide, maleic anhydride, cyanoacrylate, maleate, and fumarate.

15. A pressure sensitive hot melt adhesive comprising:

(i) a copolymer prepared by the reaction of:

(A) 10-89 mol % of an unactivated olefin;

(B) 10-89 mol % of an activated olefin; and (C) 1-50 mol % of a hydroxyl functional unactivated olefin selected from the group consisting of allyl alcohol, 3-buten-1-ol, 4-penten-1-ol, 5-hexen-1-ol, 9-decen-1-ol, 10-undecen-1-ol, and mixtures thereof;

wherein the total mol % is 100 mol %;

wherein the copolymer comprises a plurality of pendant hydroxyl groups; and wherein the weight average molecular weight (Mw) is from about 84,000 to about 2,000,000; and (ii) optionally, tackifier, plasticizer, antioxidant, inorganic fillers, desiccants, and/or adhesion promoters;

wherein the pressure sensitive hot melt adhesive is optically clear.

16. An article comprising the pressure sensitive hot melt adhesive of claim 15.

* * * * *

UNITED STATES PATENT AND TRADEMARK OFFICE
CERTIFICATE OF CORRECTION

| | |
|---|---|
| PATENT NO. | : 11,078,313 B2 |
| APPLICATION NO. | : 16/021883 |
| DATED | : August 3, 2021 |
| INVENTOR(S) | : Sridhar et al. |

It is certified that error appears in the above-identified patent and that said Letters Patent is hereby corrected as shown below:

In the Specification

Column 10, Line 2-3 change "{3,5- di-tert-butyl-4-hydroxybenzylybenzene" to --{3,5- di-tert-butyl-4-hydroxybenzyl)-benzene--.

In the Claims

Column 13, Line 63 change "diisobutylene, diisobutylene" to --isobutylene, diisobutylene--.

Column 13, Line 64 change "dimethylpentene" to --1,1 - dimethylpentene--.

Column 14, Line 31-32 change "dipentaerythritol monohydroxy penta(meth)acrylate" to --dipentadierythritol monohydroxy penta(meth)acrylate--.

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*